United States Patent [19]

Lynch et al.

[11] Patent Number: 5,546,499

[45] Date of Patent: Aug. 13, 1996

[54] SPEECH RECOGNITION SYSTEM UTILIZING PRE-CALCULATED SIMILARITY MEASUREMENTS

[75] Inventors: Thomas E. Lynch, Brighton; Vladimir Sejnoha, Cambridge; Thomas E. Dinger, Waltham, all of Mass.

[73] Assignee: Kurzweil Applied Intelligence, Inc., Waltham, Mass.

[21] Appl. No.: 250,696

[22] Filed: May 27, 1994

[51] Int. Cl.$^6$ ........................................ G10L 5/06
[52] U.S. Cl. .................. 395/2.49; 395/2.47; 395/2.61
[58] Field of Search ................... 395/2.39, 2.45, 395/2.47–2.5, 2.6–2.65; 381/43

[56] References Cited

U.S. PATENT DOCUMENTS

| | | | |
|---|---|---|---|
| 4,903,305 | 2/1990 | Gillick et al. | 395/2.49 |
| 4,975,959 | 12/1990 | Benbassat | 395/2.49 |
| 5,136,654 | 8/1992 | Ganong, III et al. | 381/41 |
| 5,280,563 | 1/1994 | Ganong | 395/2 |
| 5,337,394 | 8/1994 | Sejnoha | 395/2.5 |
| 5,345,535 | 9/1994 | Doddington | 395/2.49 |
| 5,388,183 | 2/1995 | Lynch | 395/2.51 |

OTHER PUBLICATIONS

Bob Corbett and Free Software Foundation, Inc. – *Output The Generated Parsing Program For Bison*, Copyright (C) 1984, 1986, pp. 1–12.

*Primary Examiner*—Kee Mei Tung
*Attorney, Agent, or Firm*—Henry D. Pahl, Jr.

[57] ABSTRACT

An input utterance is converted to a sequence of standard or prototype data frames which are compared with word models which are represented by respective sequences of standard or prototype probability states, there being a pre-calculable distance metric representing the degree of match between each prototype data frame and each prototype model state. Only distance measurements better than a calculated threshold are considered meaningful and those meaningful metrics are stored in a packed list. Also stored is an address array of offsets for locating particular meaningful metrics in the list, the address array being accessed by the corresponding frame and state indices. Also stored is an array for distinguishing meaningful and non-meaningful metrics. Accordingly, an input utterance can be evaluated by locating meaningful metrics in the packed list using the address array and by utilizing a default value for any non-meaningful metric.

20 Claims, 5 Drawing Sheets

SPEECH RECOGNITION SYSTEM UTILIZING PRE-CALCULATED SIMILARITY MEASUREMENTS

BACKGROUND OF THE INVENTION

The present invention relates to speech recognition and more particularly to improved methods for storing and accessing pre-calculated distance metrics useful in comparing an input utterance with a vocabulary word model.

As speech recognition systems have developed to handle increasingly larger vocabularies, one technique which has evolved is the increasing use of pre-calculated similarity or distance measurements for use in the incremental comparing of an input utterance with a model, e.g. a hidden Markov model, representing a vocabulary word. For example, the input utterance is first converted to a sequence of input data frames e.g. representing spectral energy distributions, and each raw input frame is converted to the closest matching one of a set of standard or prototype data frames in a process which is frequently referred to as vector quantization (VQ). Similarly, the word models are represented by respective sequences of standard or prototype states, e.g. probability distribution functions (pdf) in the case of hidden Markov models.

This use of standard or prototype input data frames and standard or prototype word model states allows pre-calculation of a distance metric for each possible combination of prototype input data frame with prototype model state. However, as vocabularies have grown larger, it has become necessary to increase the range of selection of both possible input data frames and prototype model states in order to provide the resolution and precision of calculation necessary to discriminate between similar sounding words. For example, for a speech recognition system having a vocabulary in the order of 20,000 words, it is advantageous to provide in the order of 1,000 standard or prototype input data frames and 2,000 standard or prototype model states. Accordingly, a complete table or matrix of pre-calculated distance or similarity metrics would comprise over 2,000,000 entries. Further, in order to fulfill its function, this table of pre-calculated distance metrics should be resident in the directly accessible or random access memory (RAM) of the processor which does the comparison calculations. It will be understood by those skilled in the art, this represents a substantial demand on system resources.

Among the several objects of the present invention may be noted the provision of a system and method for reducing the memory space required to store a table of pre-calculated distance metrics; the provision of such a system which facilitates accurate comparisons of input utterances with vocabulary word models; the provision of such a system which is very accurate and which is of relatively simple and inexpensive implementation. Other objects and features will be in part apparent and in part pointed out hereinafter.

SUMMARY OF THE INVENTION

In speech recognition apparatus of the present invention, an input utterance is initially converted to a sequence of closely matching prototype data frames selected from a pre-selected set of prototype data frames. A vocabulary of word models is stored in a form in which each model is represented by a sequence of prototype states selected from a pre-selected set of prototype states, there being a pre-calculable distance metric representing the degree of match between each prototype data frame and each prototype state. Only distance metrics better than a calculated threshold are treated as meaningful and an array is stored for distinguishing the meaningful and non-meaningful metrics. Also stored is a packed list of the meaningful pre-calculated metrics and an address array of offsets for locating particular meaningful metrics in that list, the address array being accessed by corresponding frame and state. Accordingly, an input utterance can be compared with a word model utilizing the distinguishing array to determine if a corresponding metric is meaningful or not meaningful and a meaningful metric in the packed list can be located using the address offset array. A default value is used for any non-meaningful metrics.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
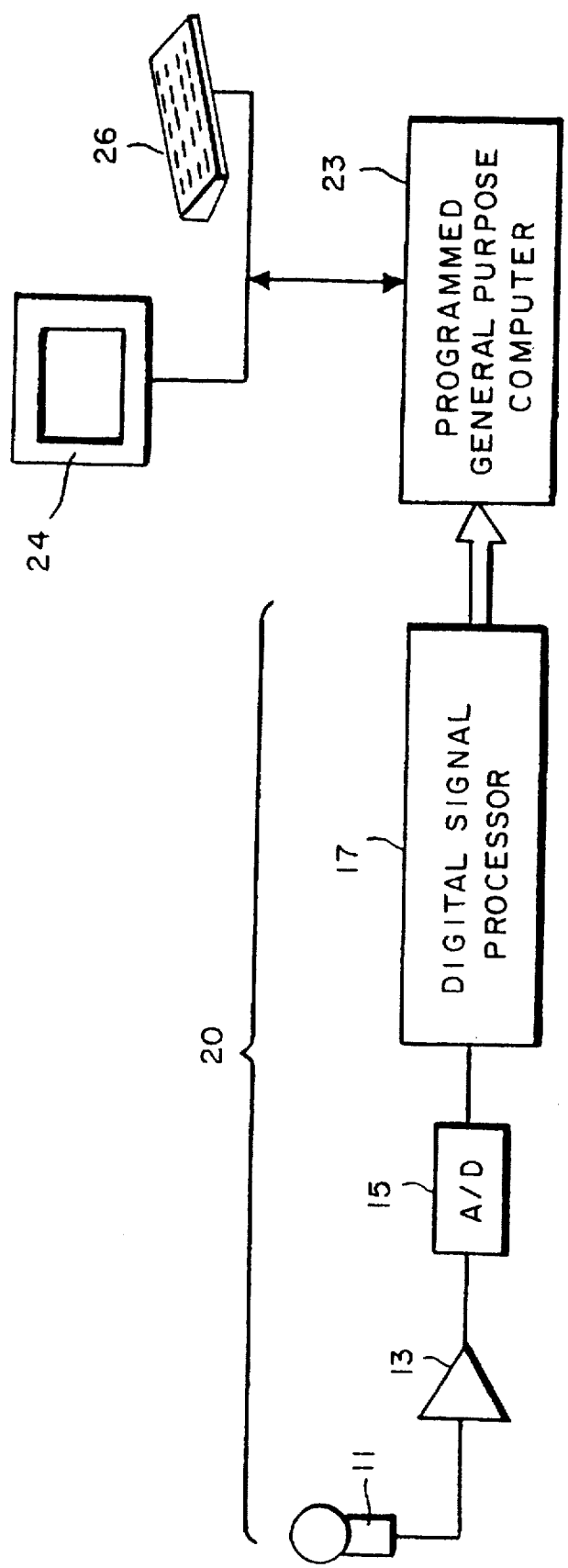
FIG. 1 is a block diagram of speech recognition apparatus employing pre-calculated distance metrics stored in accordance with the present invention.

In common with many prior art systems, the apparatus of the present invention operates by first transducing acoustic speech waveforms to obtain corresponding electrical signals and then digitizing those signals. With reference to FIG. 1, the transducer indicated there is a microphone 11 which is connected, through a suitable preamplifier 13, to an analog-to-digital converter 15. As is usual in the art, the speech signal is treated to obtain, at a succession of sample times, a sequence of digital values or data frames which characterize the speech. In the embodiment illustrated, these values are obtained by passing the speech signal through a digital signal processor 17 which performs a Fourier transform so as to extract spectral features characterizing the input speech. The collection of digital values defining the input spectrum at a given moment of time is referred to hereinafter as a frame. Each frame may be considered to be a multidimensional vector as understood by those skilled in the art.

Collectively, the front end circuitry is identified by reference character 20. Though the input signal processing is illustrated as being implemented digitally, it should be understood that analog filtering followed by analog-to-digital conversion might also be used. Likewise, while multichannel filtering is presently preferred, it should be understood that other methods of treating or encoding the raw input signal might also be employed, for example, linear predictive encoding which might also be done by special purpose hardware.

A general purpose microcomputer system 23, e.g. one employing an Intel 80486 microprocessor, is provided for general system management and control functions, as well as for the processing of distance or scoring calculations. As is conventional, computer 23 incorporates a video display 24 and a keyboard 26 for providing interaction with the system user.

The raw spectral information obtained from the front end circuitry 20 is further preprocessed in the computer 23 to replace each sample or input frame with an index which corresponds to or identifies one of a predetermined set of standard or prototype spectral distributions or frames. In the particular embodiment being described, 1024 such standard frames are utilized. In the art, this substitution is conventionally referred to as vector quantization and the indices are commonly referred to as VQ indices. The preprocessing of the input data by the computer 23 also includes an estimating of the beginning and end of a word in an unknown speech input segment based on the energy level values. It should also be understood that the particular embodiment being described is a discrete word recognizer rather than a continuous speech recognizer but that the methods of the present invention could be applied to either type.

As indicated previously, vocabulary models are represented by sequences of standard or prototype states. Rather than corresponding to spectral distributions, the state indices identify or correspond to probability distribution functions, the state spectral index essentially serves as a pointer into a table which identifies, for each state index, the set of probabilities that each prototype frame or VQ index will be observed to correspond to that state index. The table is, in effect, a precalculated mapping between all possible frame indices and all state indices. Thus, for comparing a single frame and single state, a distance measurement or a measure of match can be obtained by directly indexing into the tables using the respective indices and combining the values obtained with appropriate weighting. It is thus possible to build a table or array storing a distance metric representing the closeness of match of each standard or prototype input frame with each standard or prototype model state.

As is understood by those skilled in the art, the distance or likelihood values which fill the tables can be generated by statistical training methods. Various such training methods are known in the art and, as they do not form a part of the present invention, they are not described in further detail herein. Rather, for the purposes of the present invention, it is merely assumed that there is some metric for determining degree of match or likelihood of correspondence between input frames and the states which are used to represent vocabulary models.

As is understood by those skilled in the art, natural variations in speaking rate require that some method be employed for time aligning a sequence of frames representing an unknown speech segment with each sequence of states representing a vocabulary word. This process is commonly referred to as time warping. The sequence of frames which constitute the unknown speech segment taken together with a sequence of states representing a vocabulary model in effect define a matrix and the time warping process involves finding a path across the matrix which produces the best score, e.g. least distance or cost. The distance or cost is typically arrived at by accumulating the cost or distance values associated with each pairing of frame index with state index as described previously with respect to the VQ (vector quantization) process.

As is also understood by those skilled in the art, the final comparing of an unknown speech segment with competing vocabulary models must be highly accurate if the procedure is to discern between similar and competing vocabulary models in a system having a large vocabulary. High accuracy comparisons are computationally intensive, even using vector quantization techniques, since a large number of possible paths across the matrix must be explored. Accordingly, in order to reduce the number of high accuracy comparisons which must be performed, the apparatus of the present invention preferably also utilizes a succession of screening steps to preselect candidates. Such preselection processes are known in the art. It may be noted that the time warping functions and the pre-screening function are both facilitated by the availability of precalculated distance measurements, as is the final and most precise comparison of an input utterance with candidate word models.

Figure 2:
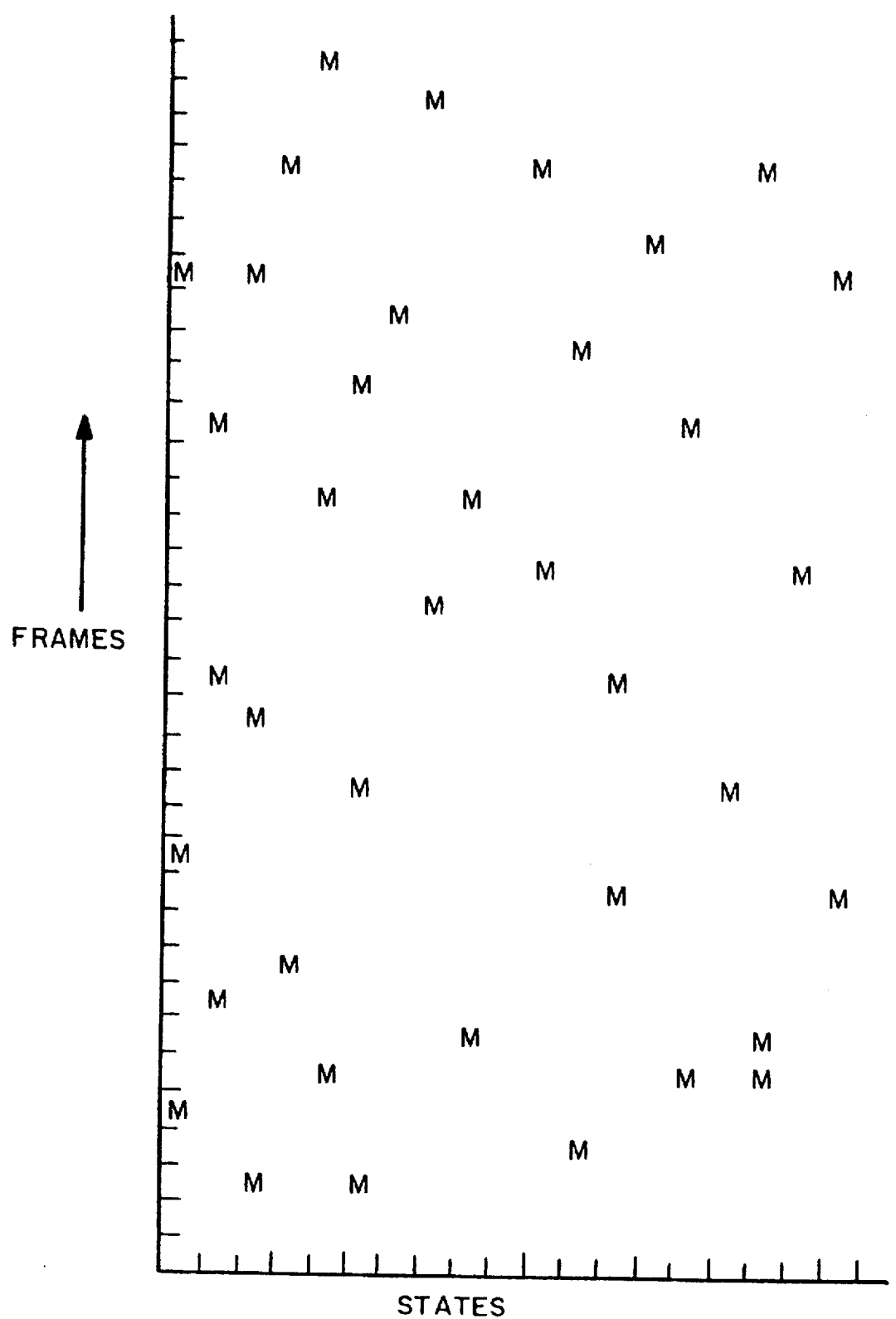
FIG. 2 is a diagram illustrated an array of precalculated distance metrics useful for comparing input data frames with model prototype states.

As indicated earlier, FIG. 2 represents a portion of a table of distance pre-calculated metrics which represents the degree of match between each standard or prototype input frame with each standard or prototype model state. In the embodiment described herein, the distance metric DIST(S, F) is meant to represent the scaled negative logarithm of the probability of observing frame F given state S.

$$DIST(S,F) = -A * \log(Pr(F/S))$$

where A is the scaling factor. Thus, for a given state or column S the sum over F of Pr(F/S) will come to unity. As is understood by those skilled in the art, this is basically a hidden Markov model.

As also indicated previously, the complete table of all the possible distance metrics would comprise in the order of two million entries, assuming one thousand prototype input data frames and two thousand prototype model states.

In terms of an address space, the horizontal axis i.e. the state indices may be considered as the higher order address bits and the frame indices to be the lower order address bits. Eleven bits and ten bits are required respectively.

In accordance with one aspect of the present invention only the more useful entries in the table of FIG. 2 are preserved and stored for use during actual speech recognition. In other words, only some entries are considered to be meaningful. In FIG. 2, the meaningful entries are represented by the letter M. Since small distances represent good matches between input frame and state, the small distance metrics are maintained exactly while larger distances considered non-meaningful are assigned default values. This approximation for the larger values is predicated on the fact that these larger values do not contribute usefully to identifying matches of word models with input utterances. A separate default value is determined for each state or column in the table of FIG. 2, as described hereinafter.

To determine the entries which are to be retained as being meaningful, the entries are first sorted starting with the highest probabilities (smallest distances). Starting with the highest probability entry, the contributions of the entries are accumulated until a fixed cumulative probability is reached. The contributing entries are retained as being meaningful. The fixed cumulative probability is a design parameter which is selected to keep the percentage of retained entries at a desired level, given the training data upon which the distances are based. In the preferred practice of the present invention, the fixed cumulative threshold is preselected so that approximately 98% of the total probability is retained. In practice, this results in about 7% of the entries being considered meaningful and being retained. However, the use of the present invention continues to be advantageous for retained entries up to about 20%.

Considering only the meaningful entries, the overall array can be considered to be a "sparse" matrix. Further, each column corresponding to a given state can be likened by analogy to a comb with most of its teeth missing. This comb analogy is useful in explaining the compression or packing method described hereinafter. The packing method can to some extent be analogized to overlying several such combs with offsets such that none of the teeth remaining in one comb interfere with the remaining teeth in any other comb. Further, as is also described in greater detail hereafter, each column or state is sub-divided so that, in effect, shorter combs are utilized in the superposing procedure utilized during the packing.

Once the meaningful entries have been determined, a default distance is determined for the remaining i.e. non-meaningful entries. This default value is determined so that the remaining probability is used up, i.e. so that the sum of all of the probabilities is unity. Thus, the default distance may be defined as follows:

$$\text{DefaultDist}(s) = -A * \log \left( \frac{1 - \text{sum}(s)}{\text{Numb}(D)} \right)$$

where Sum(s) is the sum of the probabilities for the meaningful entries and Numb(D) is the number of non-meaningful or default entries.

In the preferred embodiment of the present invention the default value is capped if it is too large. In practice, the distance metrics are stored as unsigned bytes and thus the largest possible default value is 255.

Figure 3:
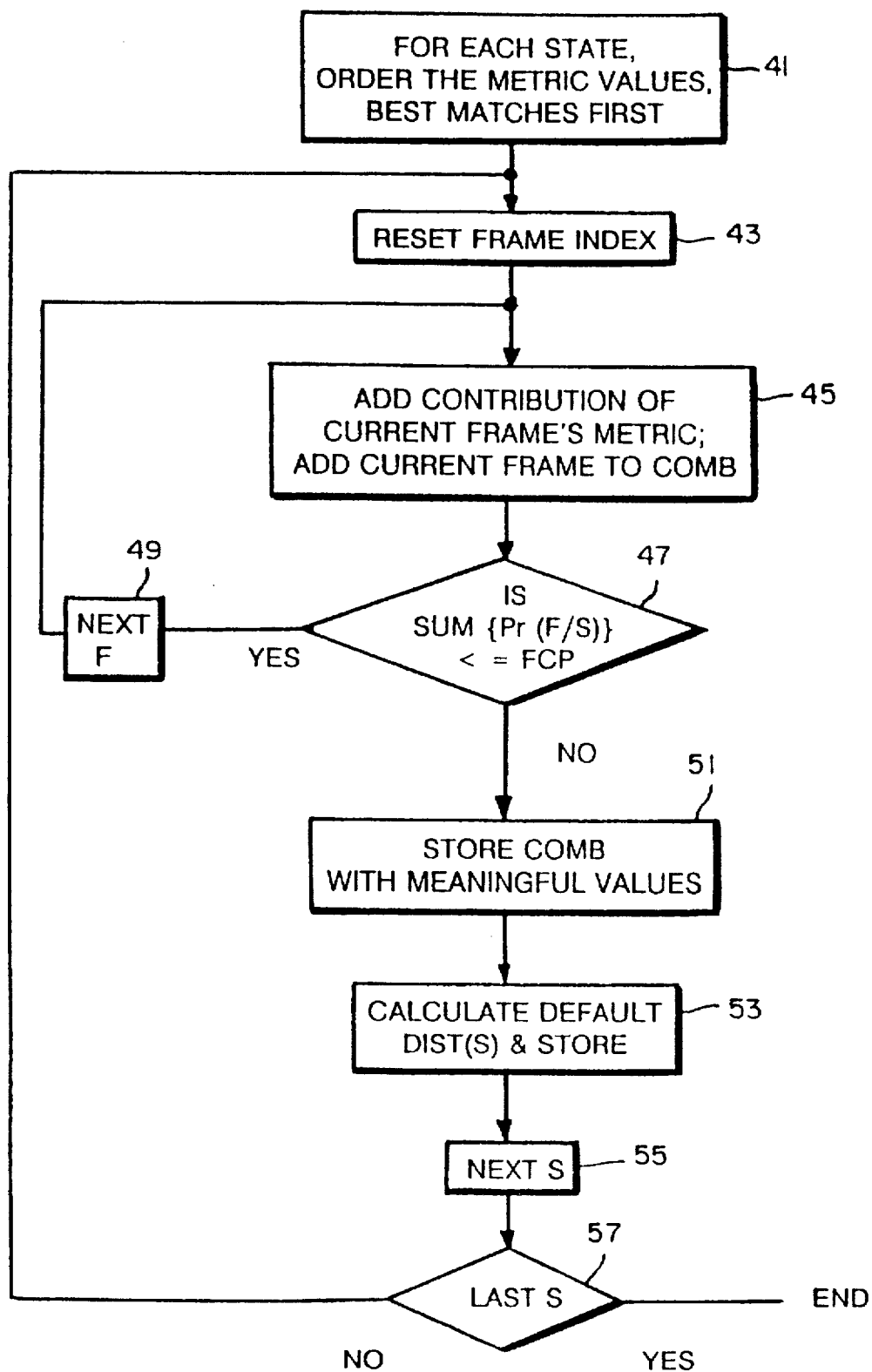
FIG. 3 is a flow chart illustrating a method of discriminating meaningful and non-meaningful metrics in a pre-calculated array such as that of FIG. 2.

This method of thresholding and distinguishing entries is illustrated in the flow chart of FIG. 3 is. As indicated at block 41, the metric values are ordered for each state, best matches first. Starting with the first frame (block 43), the current frame's metric is added as a contribution toward the cumulative probability as indicated at block 45. If the cumulation has not reached the preselected fixed cumulative probability threshold as tested at block 47, the process proceeds to the next frame as indicated at block 49.

The meaningful metrics are retained to generate a sparse or "comb" structure as described previously and this comb is stored as indicated at block 51. The default distance is then determined, as described previously, to use up the remaining probability i.e. to bring the sum of all probabilities to unity, as indicated at block 53. That default value is used for all non-meaningful metrics for that state or column. The process then proceeds to the next state as indicated at block 55 until the last state is reached as tested at block 57.

As indicated previously, the meaningful entries in the table of FIG. 2 in effect constitute a sparse matrix and the individual state columns can be likened to combs with many teeth missing. In accordance with one aspect of the present invention, this data structure is compressed or packed by, in effect, creating a list by overlaying one column onto another so long as no meaningful entries interfere and by introducing an offset to eliminate any interferences that do occur. Since the statistical likelihood of collision or conflict between meaningful data entries would increase for longer columns or "combs", the preferred implementation of this packing procedure involves breaking each column or comb into sub-combs. In the presently preferred practice of the present invention, a sub-comb size of sixty four entries is used, there being 16 sub-combs per full comb or column. In effect, the sub-dividing of columns is essentially equivalent to transferring over some of the more significant bits from the frame index so as to be lower order bits added onto the state index. With a sub-comb size of sixty four entries, four of the higher order bits from the frame index (HF) are used with the state index as a combined index or pointer as described hereinafter. Six of the lower order bits from the frame index (LF) are utilized separately as also described hereinafter.

Figure 4:
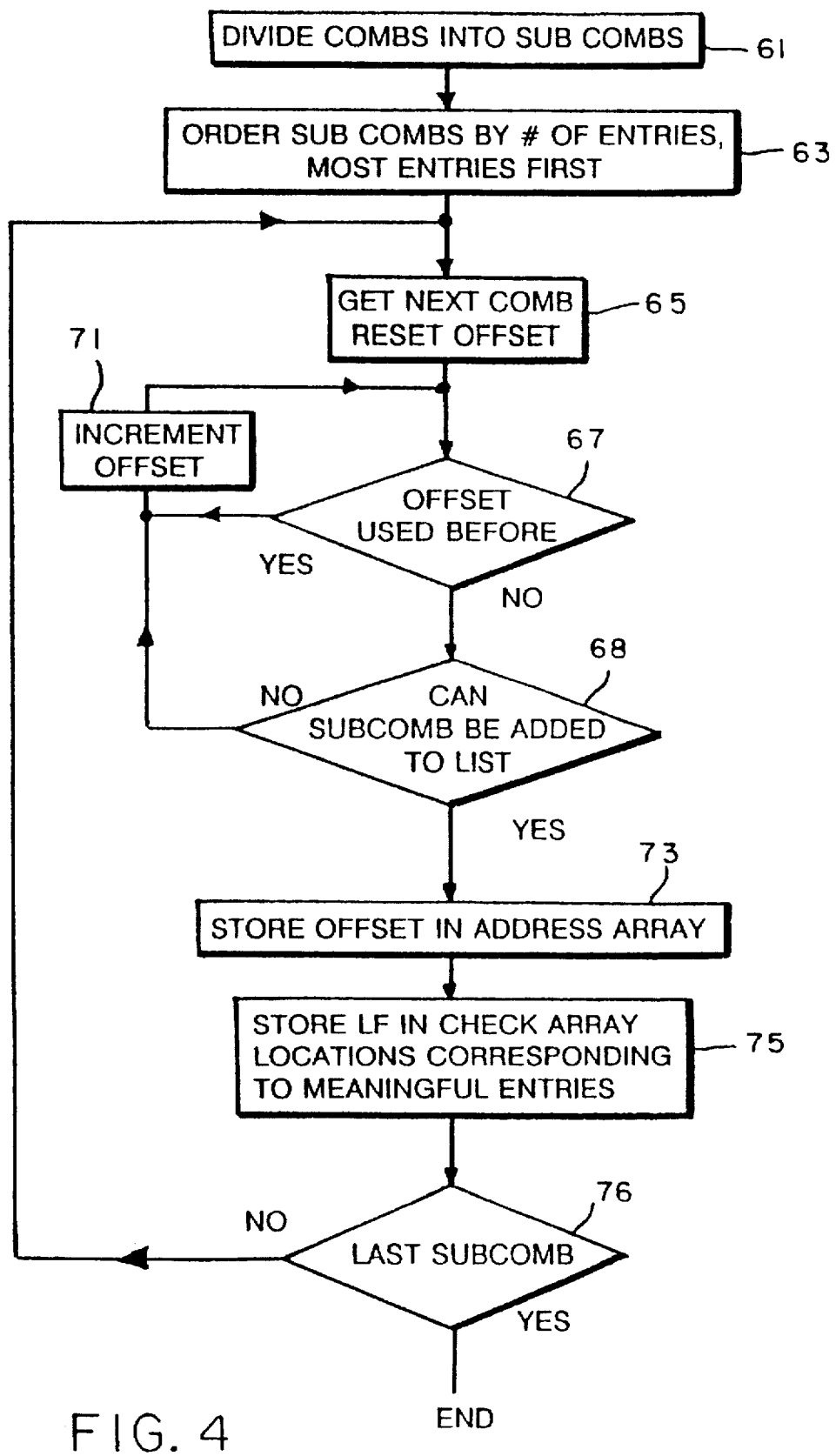
FIG. 4 is a flow chart illustrating a method of generating a packed list of meaningful metrics drawn from an array such as illustrated in FIG. 3.

The procedure for packing the data from the sparse matrix into a packed list is illustrated in the flow chart of FIG. 4. First, the columns or whole combs are divided, as indicated at block 61, into sub-combs in the manner just described. As will be understood, the sub-combs with the largest number of teeth will the hardest to fit into the empty spaces in an existing list and, thus, they are packed in first and the sparser sub-combs are left until last. Accordingly, the sub-combs are first ordered by number of entries, most entries first, as indicated at block 63. The sub-combs are successively drawn from the ordered list, as indicated at block 65, and, for each sub-comb, an offset value is initially reset.

The current offset value is tested as to whether it has been used before as indicated at block 67. If, for a given offset value, the current sub-comb cannot be added to the list, as tested at block 68, the offset value is incremented as indicated at block 71.

If the sub-comb can be added to the packed list being built, the current offset value is stored in an address offset array as indicated at block 73. This address array can be accessed by the corresponding state index and the high order bits of the frame index. As will be understood by those skilled in the art, this address offset array is necessary in order to subsequently access the packed list. The process is repeated until the last sub-comb has been reached, as tested at block 76. Employing this method of compressing the sparse matrix and using the preferred parameters given above, it is possible to build a packed list which is essentially devoid of gaps. In other words, the list is comprised essentially entirely of meaningful entries from the original matrix.

In addition to adding the meaningful entries from the sub-comb to progressively build the packed list, the procedure also builds a check list data structure which, in effect, parallels the packed list. The lower bits from the frame index (LF) are stored in each location in the check list which corresponds to a location in the packed list where a meaningful entry from the current sub-comb is being stored as indicated at block 75. As described in greater detail hereinafter, this check list is used in determining whether, for a given state index and frame index, a distance measurement should be taken from the packed list or whether a default value should be used.

As indicated, the offset values which correspond to each sub-comb are stored in an address array. Accordingly, the packed list itself can be addressed by first entering at the offset and then by then indexing with the lower order bits from the frame index to thereby obtain a particular distance measurement entry being sought.

The procedure described thus far allows for the storing of the meaningful distance metrics from the array of FIG. 2 in a packed list and an accessing of those values through the offset values stored in the address array. However, it is also necessary during actual speech recognition to determine whether there exists a meaningful entry in the packed listfor a given combination of state and frame indices. A conceptually simple method is to provide a simple single bit array which is directly accessed by the state and frame indices. The bit is a one if the corresponding distance measurement is meaningful and is zero if the metric is non-meaningful so that a default value should be used.

The presently preferred alternative, however, is to generate a check list as described with reference to FIG. 4. The check list is accessed in the same manner as the packed list, i.e. an offset value is utilized to obtain a starting point and the lower order bits from the frame index are used to find a particular location relative to the offset. In that location will be found a value equal to the lower order frame bits (LF) if the corresponding distance metric is meaningful and something else if the distance should be the default. The something else will typically be the lower order frame bits corresponding to some other frame index, assuming the lists are tightly packed. Ambiguity is avoided since each offset value can be the starting point for only one sub-comb. As will be understood, the check list should be initialized prior to the procedure of FIG. 4 so that all entries are out of range or otherwise distinguishable from possible values of LF.

As will be understood from the foregoing description, the procedures illustrated in FIGS. 3 and 4 are procedures which are conducted in order to create the data structures which are stored in a speech recognition system for use during actual recognition processes. In other words, the procedures of FIGS. 3 and 4 are things that can be done "off line" and prior to any actual speech recognition.

Summarizing, the data structures which are generated and which are stored in the memory of the system of FIG. 1 so as to facilitate speech recognition are illustrated in the following table.

| Address Offset List | Addressed by S + HF Provides Offset |
| Check List | Addressed by Offset + LF If CH = LF → Dist = Meaningful |
| Packed Distance List | Addressed by (Offset + LF) Provides distance if meaningful |
| Default List | Addressed by S Give default dist for (S) |

Firstly, there is an address offset list which is addressed by the model state index (S) including the higher order bits (HF) from the frame index, assuming the combs are broken into sub-combs. This list provides an offset value. There is a check list which is addressed by the offset and the lower order frame bits (LF). If the value read out of this list is equal to the lower order frame bit (LF), the corresponding distance metric is considered to be meaningful. For meaningful metrics the packed distance list is similarly read using the offset value and the lower order frame bits. The value read out provides the actual distance measurement, previously determined to be meaningful. If the value read out from the check list indicates that the corresponding metric is non-meaningful or default, the default list is addressed by the state index and gives the default distance for that state.

Figure 5:
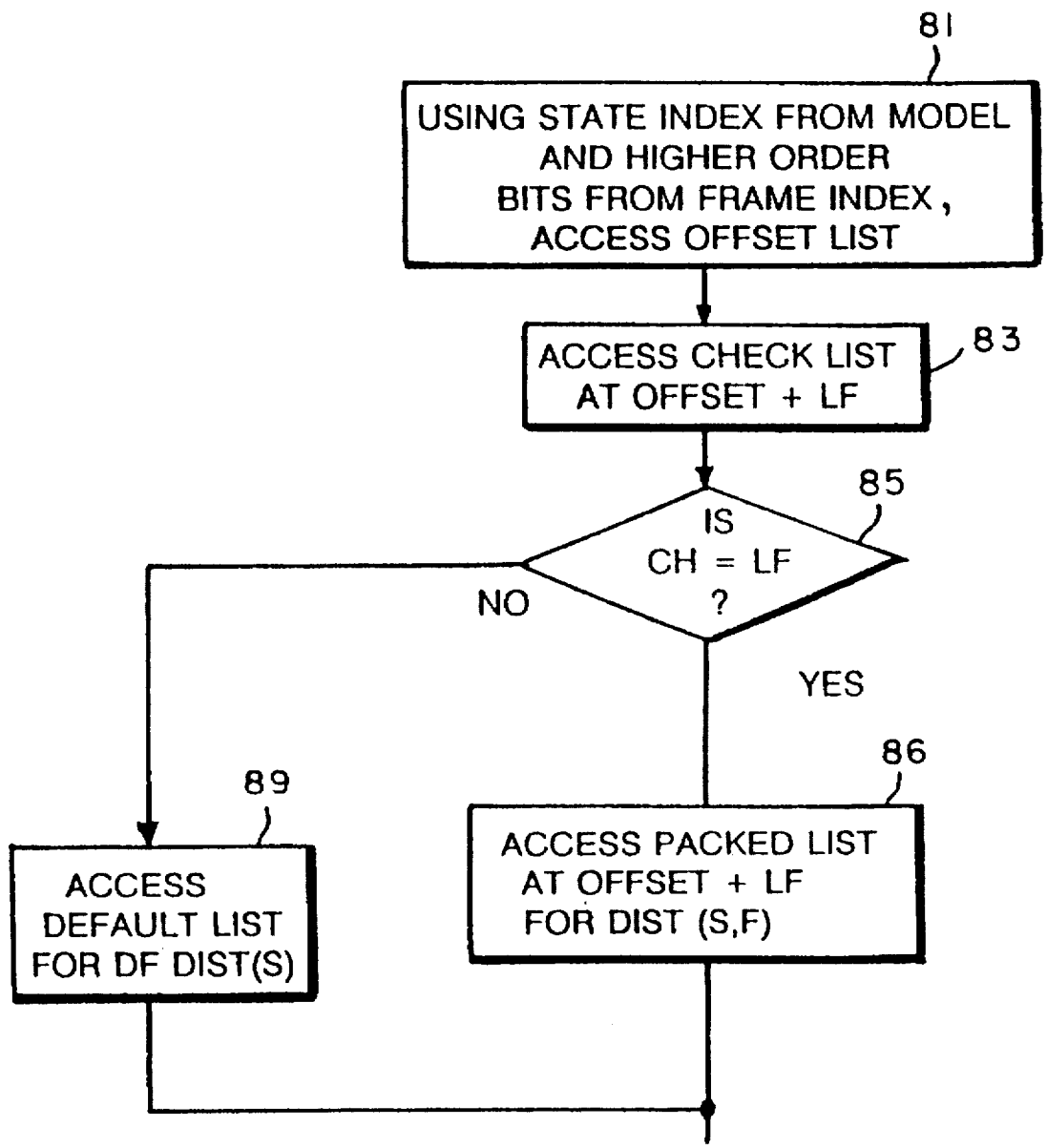
FIG. 5 is a flow chart illustrating a method of accessing stored distance metrics during speech recognition in the apparatus of FIG. 1.

The procedure employed for utilizing these data structures during actual speech recognition in the apparatus of FIG. 1 is illustrated in FIG. 5.

As indicated at block 81, the offset list is initially accessed using the state index from the word model and the higher order bits of the frame index from the utterance to obtain an offset value. The offset value and the lower order bits of the frame index are then utilized to access the check list as indicated at block 83. If the value obtained from the check list (CH) is equal to the lower order frame bits (LF) as tested at block 85, the packed distance metric list is similarly accessed to obtain the corresponding distance measurement DIST(S,F) as indicated at 86. On the other hand, if the value read from the check list is not equal to the lower order frame bits, the default list is accessed as indicated at block 89 to obtain the default distance corresponding to that state index.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A method of preparing a compressed matrix of precalculated distance metrics for comparing an input utterance which is represented by a sequence of prototype data frames selected from a preselected set of prototype data frames with at least some of a vocabulary of word models each of which is represented by a sequence of prototype states selected from a preselected set of prototype states, said method comprising:

generating an array of distance metrics for all combinations of prototype frames and prototype states;

for each state, identifying the frames for which the corresponding metric is meaningful;

for each state, determining a common default value for non-meaningful metrics;

for at least one group of frames corresponding to each state, determining the locations within said array containing meaningful metrics;

building a combined list of meaningful metrics by adding the meaningful metrics from successive groups of frames using an offset for each group which allows the meaningful metrics for each group to fit into currently unused positions in the list, the relative positions of meaningful metrics within each group being maintained in the list;

building an array of said offset values accessed by the corresponding state;

building an array distinguishing meaningful and non-meaningful entries in the original array of distance metrics;

whereby a measure of match between an input utterance and a vocabulary word model is obtainable by combining corresponding metrics using a default value for non-meaningful metrics and locating respective meaningful metrics in said combined list using said array of offset values.

2. A method of preparing a compressed matrix of precalculated distance metrics for comparing an input utterance which is represented by a sequence of prototype data frames selected from a preselected set of prototype data frames with at least some of a vocabulary of word models each of which is represented by a sequence of prototype states selected from a preselected set of prototype states, said method comprising:

generating an array of distance metrics for all combinations of prototype frames and prototype states;

for each state, identifying the frames for which the corresponding metric is meaningful;

for each state, determining a common default value for non-meaningful metrics;

for subgroups of frames corresponding to each state, determining the locations within said array containing meaningful metrics;

building a combined list of meaningful metrics by adding the meaningful metrics from successive subgroups of frames using an offset for each subgroup which allows the meaningful metrics for each group to fit into currently unused positions in the list, the relative positions of meaningful metrics within each subgroup being maintained in the list;

building an array of said offset values accessed by the corresponding subgroup and state;

building an array distinguishing meaningful and non-meaningful entries in the original array of distance metrics;

whereby a measure of match between an input utterance and a vocabulary word model is obtainable by combining corresponding metrics using a default value for non-meaningful metrics and locating respective meaningful metrics in said combined list using said array of offset values.

3. A method of preparing a compressed matrix of precalculated distance metrics for comparing an input utterance which is represented by a sequence of prototype data frames selected from a preselected set of prototype data frames with at least some of a vocabulary of word models each of which is represented by a sequence of prototype states selected from a preselected set of prototype states, said method comprising:

generating a matrix of distance metrics for all combinations of prototype frames and prototype states;

for each state, order the metrics, best matches first;

cumulating the metrics, best matches first, for each frame until a preselected threshold is reached;

for each state, assigning a common default value for all metrics which did not contribute to the cumulation;

for the frames corresponding to each state, determining the locations within said array containing contributing metrics, said metrics being then considered meaningful;

building a combined list of meaningful metrics by adding the meaningful metrics from successive groups of contributing frames using an offset for each group which allows the meaningful metrics for each group to fit into currently unused positions in the list, the relative positions of meaningful metrics within each group being maintained in the list;

building an array of said offset values accessed by the corresponding frame and state;

building an array distinguishing meaningful and non-meaningful entries in the original array of distance metrics;

whereby a measure of match between an input utterance and a vocabulary word model is obtainable by combining corresponding metrics using a default value for non-meaningful metrics and locating respective meaningful metrics in said combined list using said array of offset values.

4. A method as set forth in claim 3 wherein said threshold is selected to produce in the order of seven percent meaningful metrics.

5. A method as set forth in claim 3 wherein said metrics correspond to probabilities and wherein said common default value is selected to cause the sum of the probabilities corresponding to all meaningful and all non-meaningful metrics to be essentially equal to unity.

6. A method as set forth in claim 3 wherein the meaningful entries for each state are divided into subgroups prior to combining with offsets.

7. A method as set forth in claim 6 wherein said subgroups are ordered by number of meaningful entries prior to combining with offsets and wherein successive subgroups are added to build the combined list starting with the subgroups having the largest number of meaningful entries.

8. A method as set forth in claim 3 wherein said distinguishing array comprises a check list paralleling said combined list.

9. A method as set forth in claim 8 wherein said check list contains entries corresponding to respective frame identifiers.

10. A method of preparing a compressed matrix of precalculated distance metrics for comparing an input utterance which is represented by a sequence of prototype data frames selected from a preselected set of prototype data frames with at least some of a vocabulary of word models each of which is represented by a sequence of prototype states selected from a preselected set of prototype states, said method comprising:

generating a matrix of distance metrics for all combinations of prototype frames and prototype states, locations within said matrix being addressable by respective state and frame multibit indices;

for each state, order the metrics, best matches first;

cumulating the metrics, best matches first, for each frame until a preselected threshold is reached;

for each state, assigning a common default value for all metrics which did not contribute to the cumulation;

for the frames corresponding to each state, determining the locations within said array containing contributing metrics, said metrics being then considered meaningful;

dividing the group of frames corresponding to each state into subgroups identifiable by the higher order bits of the frame multibit index;

building a combined list of meaningful metrics by adding the meaningful metrics from successive sub-groups of contributing frames, using an offset for each sub-group which allows the meaningful entries to fit into currently unused positions in the list, the relative positions of meaningful metrics within each sub-group being maintained in the list;

building an array of said offset values accessed by the corresponding state index and the higher order bits of the frame multibit index;

building a check list paralleling said combined list and containing entries distinguishing meaningful and non-meaningful entries in the original array of distance metrics; whereby a measure of match between an input utterance and a vocabulary word model is obtainable by combining corresponding metrics using a default value for non-meaningful metrics and locating respective meaningful metrics in said combined list using said array of offset values.

11. A method as set forth in claim 10 wherein each offset value acts as the starting point for only one subgroup and wherein the entries in said check list correspond to the lower order bits in the frame index.

12. A method of preparing a compressed matrix of precalculated distance metrics for comparing an input utterance which is represented by a sequence of prototype data frames selected from a preselected set of prototype data frames with at least some of a vocabulary of word models each of which is represented by a sequence of prototype states selected from a preselected set of prototype states, said method comprising:

generating an array of distance metrics for all combinations of prototype frames and prototype states;

designating as meaningful metrics which represent a probability better than a preselected criteria, said criteria being selected to produce meaningful metrics in less than about twenty percent of said entries thereby to generate a sparse matrix of meaningful entries;

generating a data structure identifying which metrics in said matrix have been designated as meaningful;

generating at least one default value for non-meaningful metrics, each default value being common to a substantial number of said non-meaningful metrics; and compressing said sparse matrix into a packed list comprised essentially entirely of said meaningful entries.

13. A method as set forth in claim 12 generating a data structure pointing to meaningful entries in said packed list based on corresponding locations in said array.

14. Speech recognition apparatus comprising:

means for converting an input utterance to a sequence of utterance data frames;

means for converting each of said utterance data frames to a closely matching prototype data frame selected from a preselected set of prototype data frames thereby to obtain a corresponding sequence of prototype data frames;

means for storing a vocabulary of word models each of which is represented by a sequence of prototype states selected from a preselected set of prototype states, there being a precalcuable distance metric for each possible pairing of prototype data frame and prototype state, distance metrics better than a calculated value being designated as meaningful;

means for storing a list of only the precalculated metrics which are designated as meaningful, an array distinguishing the meaningful and non-meaningful metrics, and an address array of offsets for locating particular meaningful metrics in said list, said address array being accessed by the corresponding frame and state;

means for comparing an input utterance with at least some of said word models including a combining of the respective metrics, wherein said comparing means utilizes said distinguishing array to determine if a corresponding metric is meaningful or non-meaningful and utilizes, in the combining, a default value for any non-meaningful metric; and locates corresponding meaningful metrics in said list using said address array.

15. Apparatus as set forth in claim 14 wherein said metrics correspond to probabilities and wherein the probabilities associated with the meaningful metrics for each state essentially sum to a preselected threshold.

16. Apparatus as set forth in claim 15 wherein the default value for each prototype state corresponds to a probability such that the sum of probabilities for all of the non-meaningful metrics plus said preselected threshold essentially equals unity.

17. Speech recognition apparatus comprising:

means for converting an input utterance to a sequence of utterance data frames;

means for converting each of said utterance data frames to a closely matching prototype data frame selected from a preselected set of prototype data frames thereby to obtain a corresponding sequence of prototype data frames;

means for storing a vocabulary of word models each of which is represented by a sequence of prototype states selected from a preselected set of prototype states, there being a precalcuable distance metric for each possible pairing of prototype data frame and prototype state, distance metrics better than a preselected criteria being designated as meaningful;

means for storing a packed list of only the precalculated metrics which are designated as meaningful, a check list paralleling said packed list and containing entries distinguishing meaningful and non-meaningful metrics, a list of default values for the respective states, and an address array of offsets for locating particular meaningful metrics in said list, said address array being accessed by the corresponding frame and state;

means for comparing an input utterance with at least some of said word models including a combining of the respective metrics, wherein said comparing means utilizes said distinguishing array to determine if a corresponding metric is meaningful or non-meaningful and utilizes, in the combining, a respective default value for any non-meaningful metric; and locates corresponding meaningful metrics in said list using said address array.

18. Apparatus as set forth in claim 17 wherein said metrics correspond to probabilities and wherein the probabilities associated with the meaningful metrics for each state essentially sum to a preselected threshold.

19. Apparatus as set forth in claim 18 wherein said preselected threshold encompasses about 98% of the probability.

20. Apparatus as set forth in claim 18 wherein the default value for each prototype state corresponds to a probability such that the sum of probabilities for all of the non-meaningful metrics plus said preselected threshold essentially equals unity.

* * * * *